(12) United States Patent
Van Dyke et al.

(10) Patent No.: US 8,341,875 B2
(45) Date of Patent: Jan. 1, 2013

(54) AQUATIC SNAIL TRAP, BAIT, AND METHOD OF USE THEREOF

(76) Inventors: Jess Michael Van Dyke, Tallahassee, FL (US); Sean Ernst McGlynn, Tallahassee, FL (US); Lee Anthony Ingram, Defunrak Springs, FL (US)

( * ) Notice: Subject to any disclaimer, the term of this patent is extended or adjusted under 35 U.S.C. 154(b) by 454 days.

(21) Appl. No.: 12/587,342

(22) Filed: Oct. 6, 2009

(65) Prior Publication Data

US 2010/0083561 A1 Apr. 8, 2010

Related U.S. Application Data

(60) Provisional application No. 61/195,315, filed on Oct. 6, 2008.

(51) Int. Cl.
*A01M 1/10* (2006.01)
(52) U.S. Cl. ............................................. 43/121; 43/107
(58) Field of Classification Search ...... 43/58, 100–103, 43/107, 121, 131
See application file for complete search history.

(56) References Cited

U.S. PATENT DOCUMENTS

| | | | | | |
|---|---|---|---|---|---|
| 2,239,937 | A | * | 4/1941 | Smith | 43/131 |
| 3,303,600 | A | * | 2/1967 | Freeman | 43/131 |
| 3,550,308 | A | * | 12/1970 | Ibach | 43/121 |
| 3,772,820 | A | * | 11/1973 | Bond | 43/131 |
| 3,978,607 | A | * | 9/1976 | Piere | 43/131 |
| 4,251,946 | A | * | 2/1981 | Lindley | 43/131 |
| 4,328,637 | A | * | 5/1982 | Eichmuller et al. | 43/121 |
| 4,747,230 | A | * | 5/1988 | Zalesky | 43/121 |
| 4,756,116 | A | * | 7/1988 | Cutter | 43/108 |
| 5,175,958 | A | * | 1/1993 | Wedemeyer | 43/121 |
| 5,657,575 | A | * | 8/1997 | Miller et al. | 43/131 |
| D456,481 | S | * | 4/2002 | Stevenson et al. | D22/122 |
| 6,609,329 | B2 | * | 8/2003 | McCallum | 43/107 |

* cited by examiner

*Primary Examiner* — Kimberly Berona
*Assistant Examiner* — Danielle Clerkley
(74) *Attorney, Agent, or Firm* — William Hollimon

(57) ABSTRACT

A device for trapping and collecting snails in an aquatic environment. The device includes a basin with a lid having a top opening through which snails may enter, a floating screen to keep snails retained, and a standpipe to anchor the device to the bottom of a water body and to serve as a location for the deposit of snail eggs.

16 Claims, 7 Drawing Sheets

US 8,341,875 B2

AQUATIC SNAIL TRAP, BAIT, AND METHOD OF USE THEREOF

PRIORITY OF INVENTION

This application claims priority of invention under 35 USC 119(e) from U.S. Provisional Patent Application 61/195,315 filed Oct. 6, 2008.

BACKGROUND OF THE INVENTION

1. Field of the Invention

This invention relates to the field of traps for aquatic snails. More specifically, the present invention comprises a system and method for safely and efficiently baiting, trapping, and removing unwanted and invasive aquatic snails.

2. Description of the Related Art

The freshwater snails of the Family Ampullariidae are known as "apple snails" and are a non-native, invasive species of freshwater snail. These snails are voracious herbivores that particularly prefer young, succulent plants, such as rice seedlings, but can also uproot and consume mature aquatic plants. Left unchecked, these snails can consume all the vegetation in a water body. Further, these snails have become major pests in 18 countries and have made the list of the top 100 Globally Invasive Alien Species by the ISSG. These snails are also intermediate hosts of the rat lungworm (*angiostrongylus cantonensis*) which can cause eosinophilic meningitis in humans.

Two South American apple snails, the Island Apple Snail (*Pomacea Insularum*) and the Channeled Apple Snail (*Pojmacea Canaliculata*) are spreading rapidly from Texas to South Carolina and represent a major risk to aquatic ecosystems, agriculture, and human health in the southern coastal plain of the United States. Currently, there are no effective, environmentally-sound control methods.

Further, because of the nature of invasive species, early detection and early remedial actions are the best forms of control. Once an invasive species becomes established, it is much more difficult to control or eradicate.

Apple snails have excellent chemoreception and thus can be lured using food items that they prefer. These snails are able to rapidly control buoyancy, and readily dig into the substrate of a water body to obtain food. Apple snails are gregarious and readily congregate under objects providing shade. Finally, apple snails readily lay their eggs above the water line on available vertical surfaces.

Generally, the prior art is restricted to traps and bait for terrestrial snails. Current control technologies for aquatic snails typically include application of copper containing compounds (e.g., copper sulfate) to a water body—a very blunt instrument that is toxic to many species besides aquatic snails, and hand picking, an expensive, time consuming, and ineffective process. Thus, there is a need for a simple, efficient, low-cost bait and trap system that can be used to detect and control populations of invasive aquatic snails.

BRIEF SUMMARY OF THE INVENTION

The present invention provides a system and method for the efficient, safe, and convenient detection, trapping, and collecting of aquatic snails for removal from a water body. It further includes a novel bait that attracts aquatic snails, is long lasting in an aquatic environment, and is environmentally friendly. The present invention further acts as a sentinel to provide early warning of an aquatic snail infestation.

Figure 1:
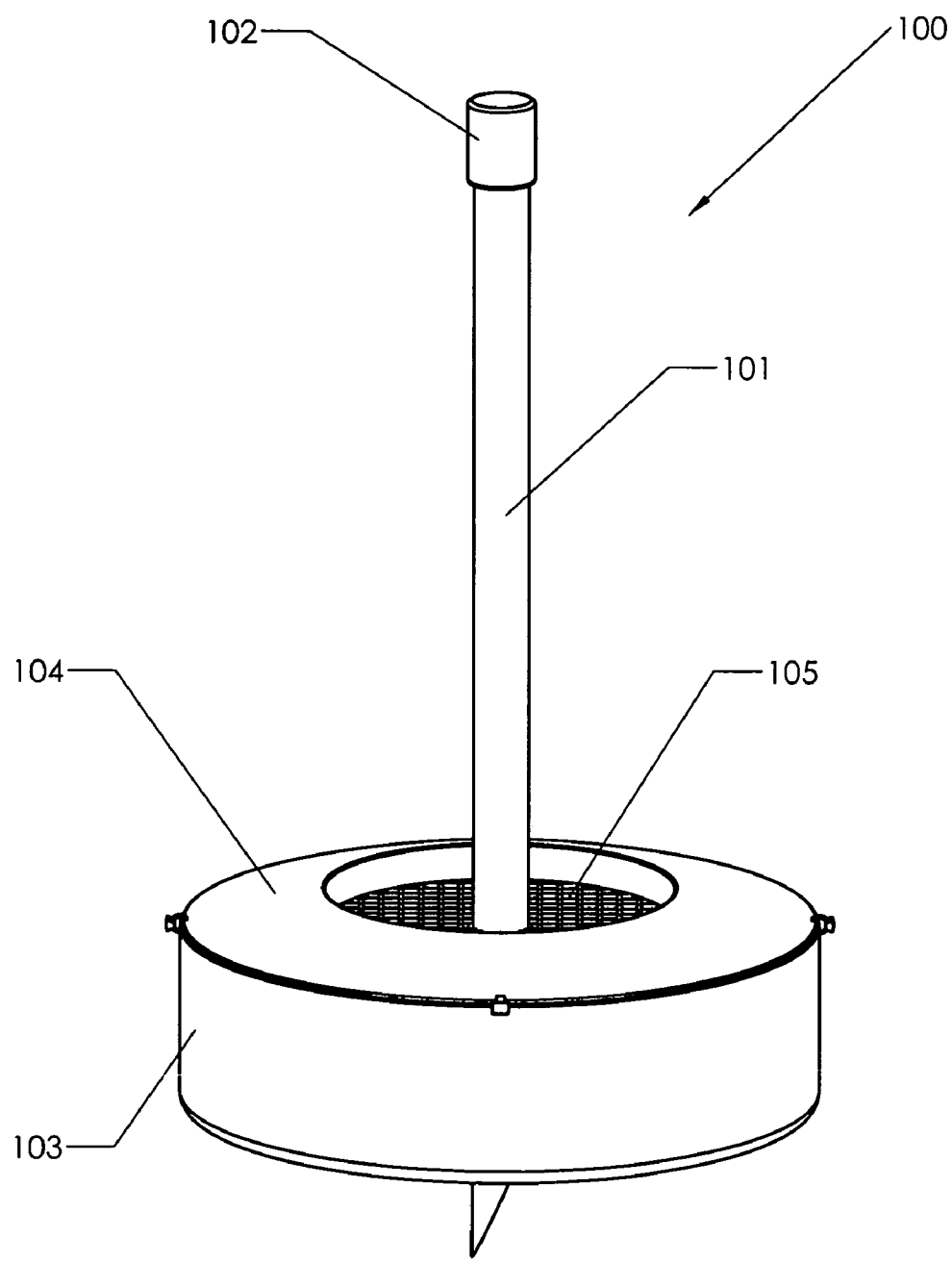
FIG. 1 is a side isometric view of the snail trap of the present invention.

| REFERENCE NUMERALS IN THE DRAWINGS | |
|---|---|
| 100 | trap |
| 101 | standpipe |
| 102 | cap |
| 103 | basin |
| 104 | lid |
| 105 | screen |
| 300 | vertical surface |
| 301 | edge |
| 302 | vertical wall |
| 304 | base |
| 305 | penetration |
| 306 | shoulder |
| 307 | lip |
| 501 | cable tie |
| 601 | copper strip |
| 701 | bait |
| 702 | water surface |
| 703 | bottom |

DETAILED DESCRIPTION OF THE INVENTION

Figure 3:
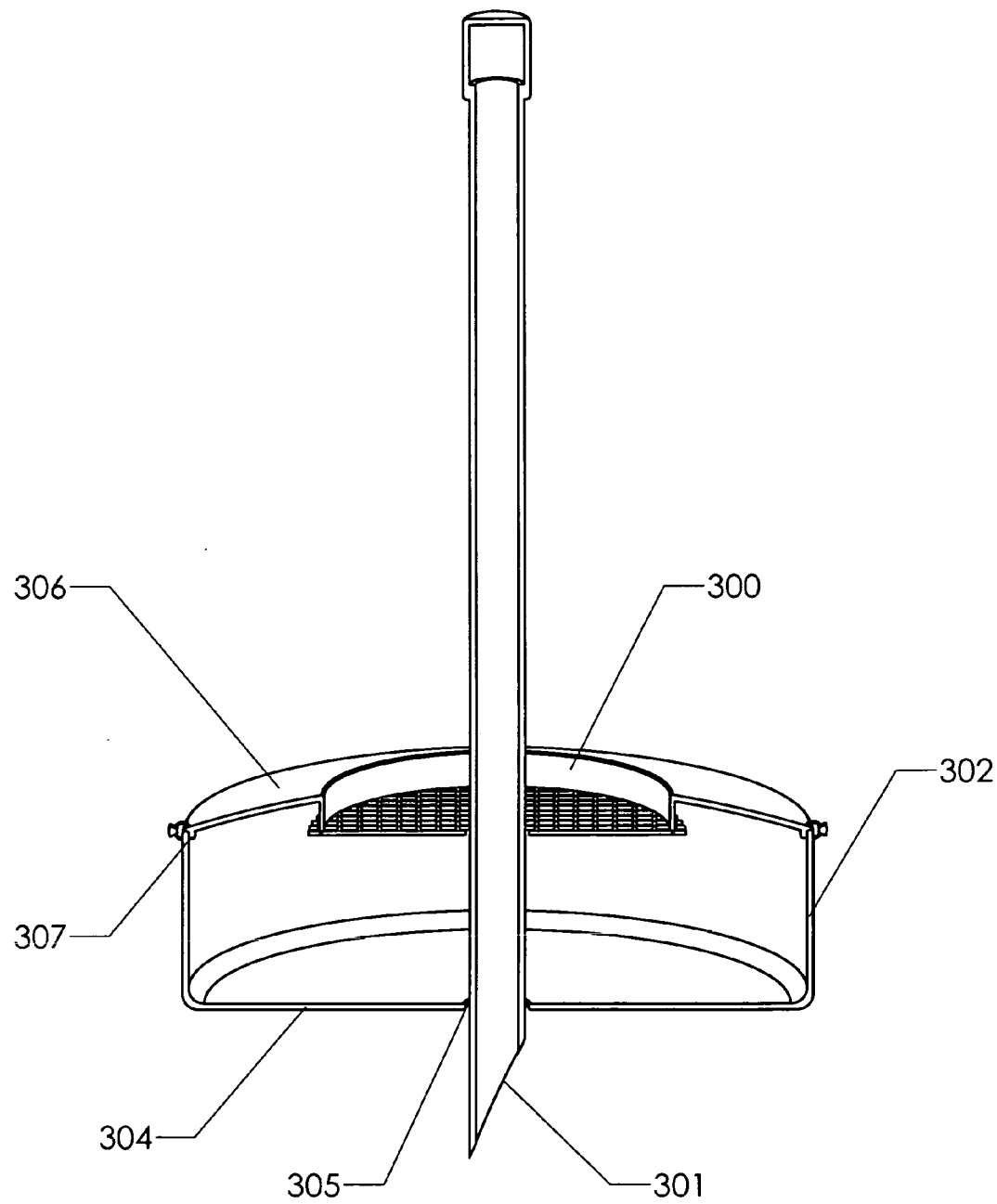
FIG. 3 is a vertical section of the snail trap of the present invention.
Figure 4:
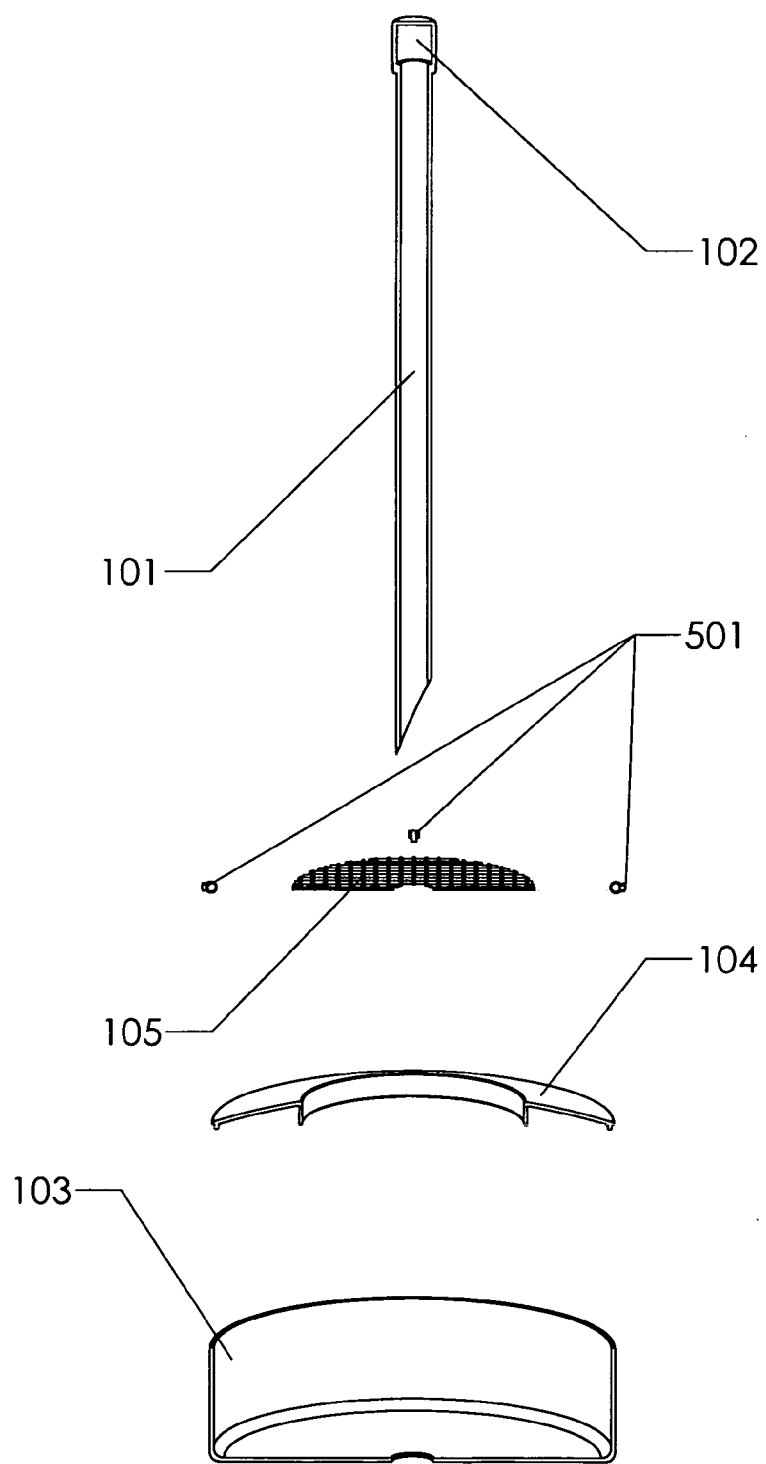
FIG. 4 is an exploded view of the snail trap of the present invention.
Figure 5:
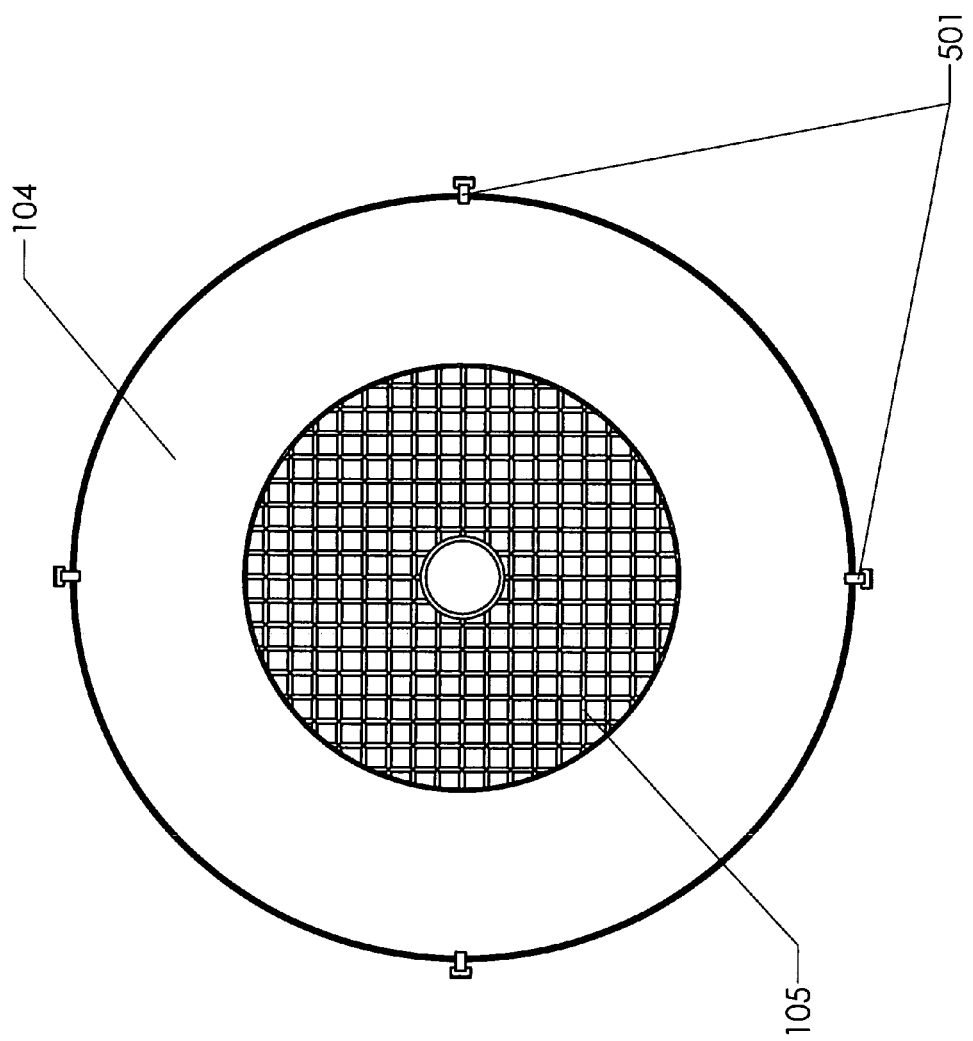
FIG. 5 is a top view of the snail trap of the present invention.

FIG. 1 shows an isometric view of a preferred embodiment of the trap of the present invention. Trap 100 is comprised of a basin 103, a lid 104, a standpipe 101 with a cap 102, and a screen 105. Referring to FIG. 3, a sectional view of trap 100 is shown. In this embodiment, basin 103 is cylindrical with a base 304 and a vertical wall 302 extending vertically from the periphery of base 304. Lid 104 is removably attached to the end of vertical wall 302 that is remote from base 304. In this embodiment, lid 104 includes lip 307 to facilitate the attachment of lid 104 to vertical wall 302. Lid 104 is preferably attached to vertical wall 302 by cable ties 501 in four locations. Alternatively, lid 104 may be attached by fasteners such as straps or buckles. Preferably, basin 103 and lid 104 are constructed from a durable plastic material such as PVC that is suitable for aquatic environments and strong enough to support the weight of trapped snails when removed from the water body. Alternatively, these components may be constructed from any materials that are suitable for immersion in water and that do not act as a snail repellent. In another alternative embodiment, lid 104 and basin 103 are formed in a single piece as a unitary component.

Figure 2:
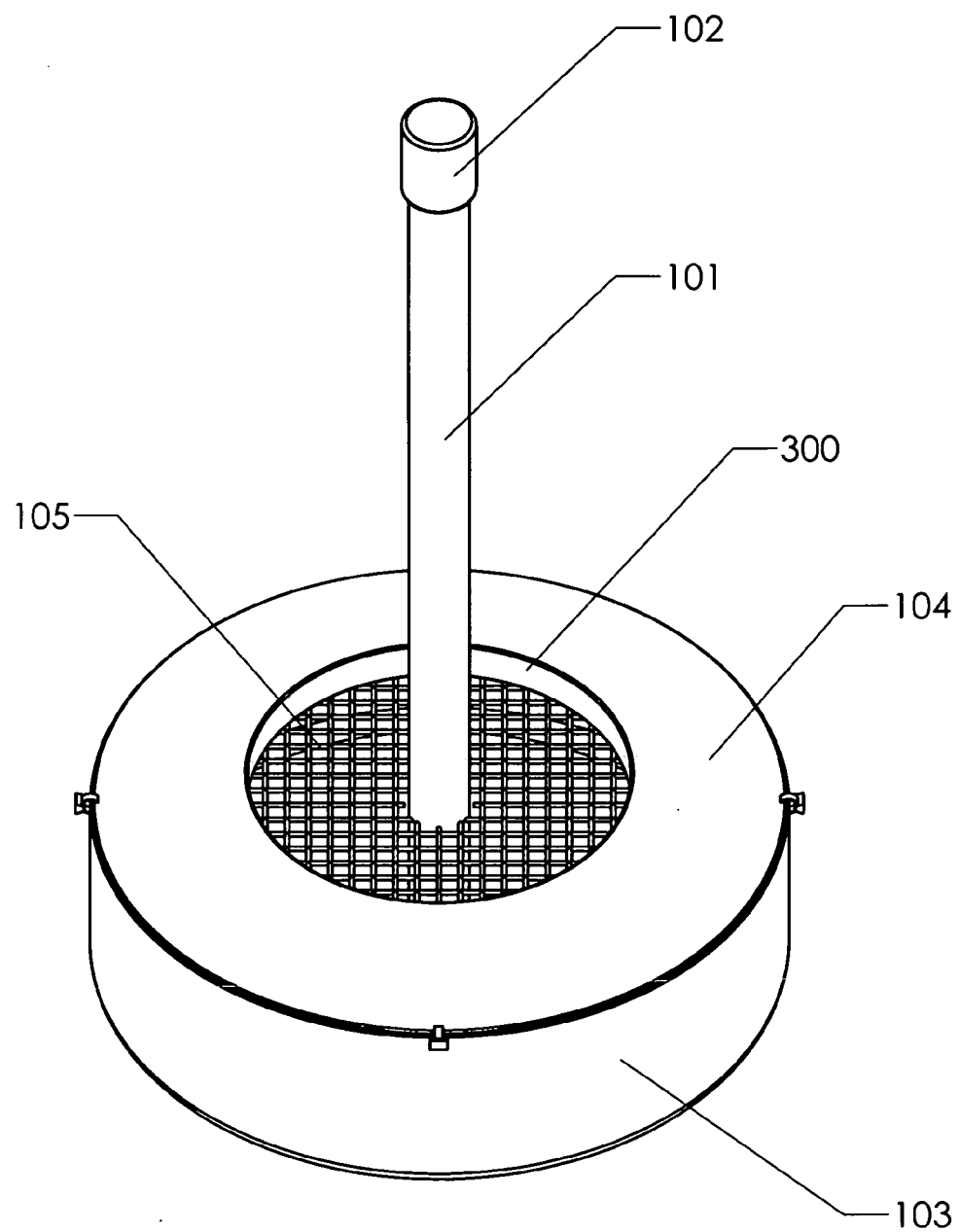
FIG. 2 is a top isometric view of the snail trap of the present invention.

Shoulder 306 on a gradual, upward radius, extends inwardly from lid 104 and terminates in vertical surface 300. Vertical surface 300 extends vertically downward from shoulder 306 to form a shear vertical surface 300. As shown in FIGS. 1 and 2, standpipe 101 extends axially from trap 100 and, as shown in FIG. 3, extends through the center of base 304 via penetration 305. Penetration 305 is slightly larger in diameter than standpipe 101, thereby allowing axial movement of standpipe 101 while preserving the trapping integrity of trap 100. Alternatively, base 304 does not have any penetrations and may be anchored by including weights within basin 103. Standpipe 101 is preferably standard PVC pipe. Screen 105 is preferably circular in shape with a diameter slightly larger than the diameter of the opening defined by vertical surface 300. Screen 105 has a center opening that is slightly larger than the diameter of standpipe 101 and is designed to slidingly receive standpipe 101 Screen 105 has a mesh size that is large enough to allow movement of water but small enough to prevent the passage of snails. Screen 105 is preferably formed from a durable, plastic material such as PVC. Further, screen 105 is formed from material that is less dense than water so that it is buoyant. Preferably, screen 105 is flat. In alternative embodiments, screen 105 may be dome shaped or cone shaped.

Figure 6:
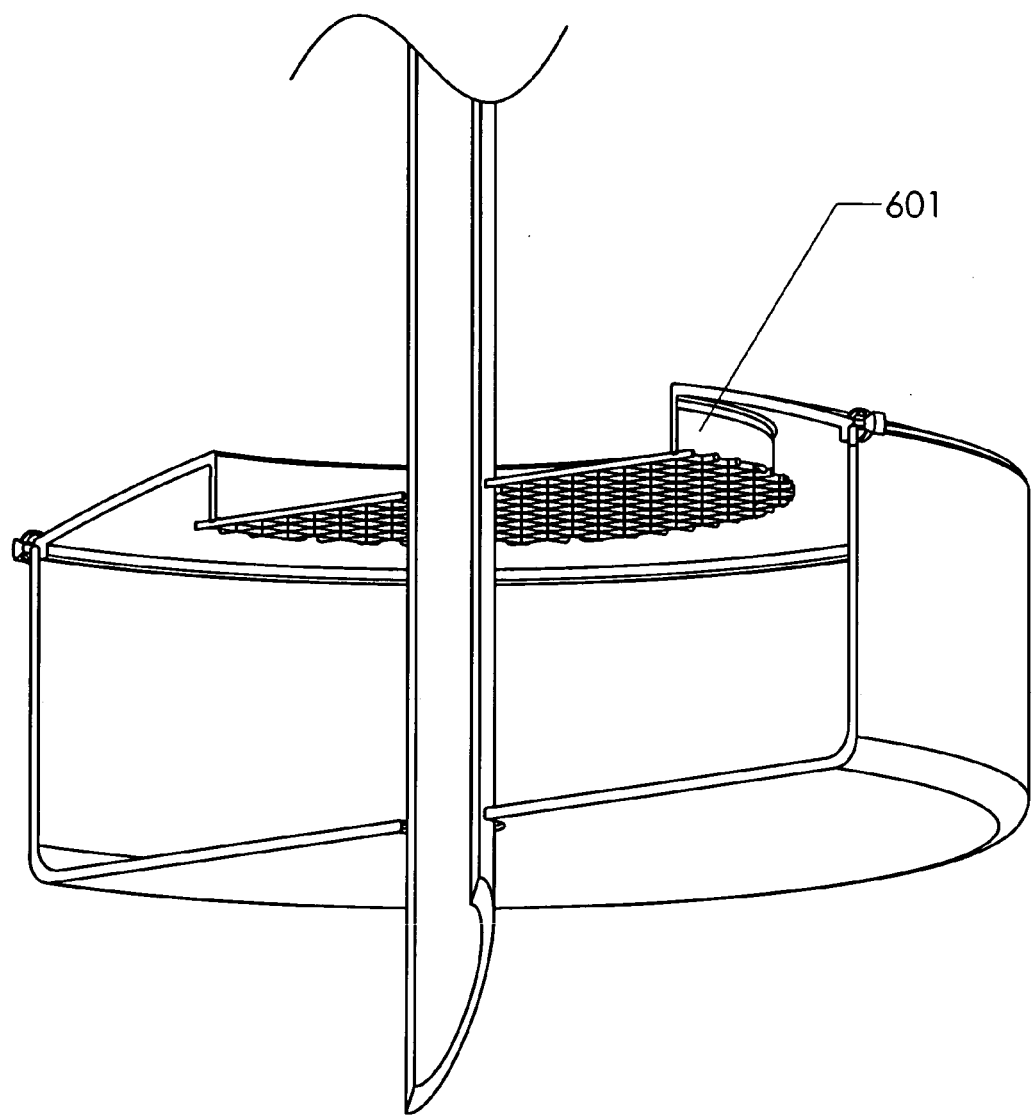
FIG. 6 is a vertical section of the snail trap of the present invention
Figure 7:
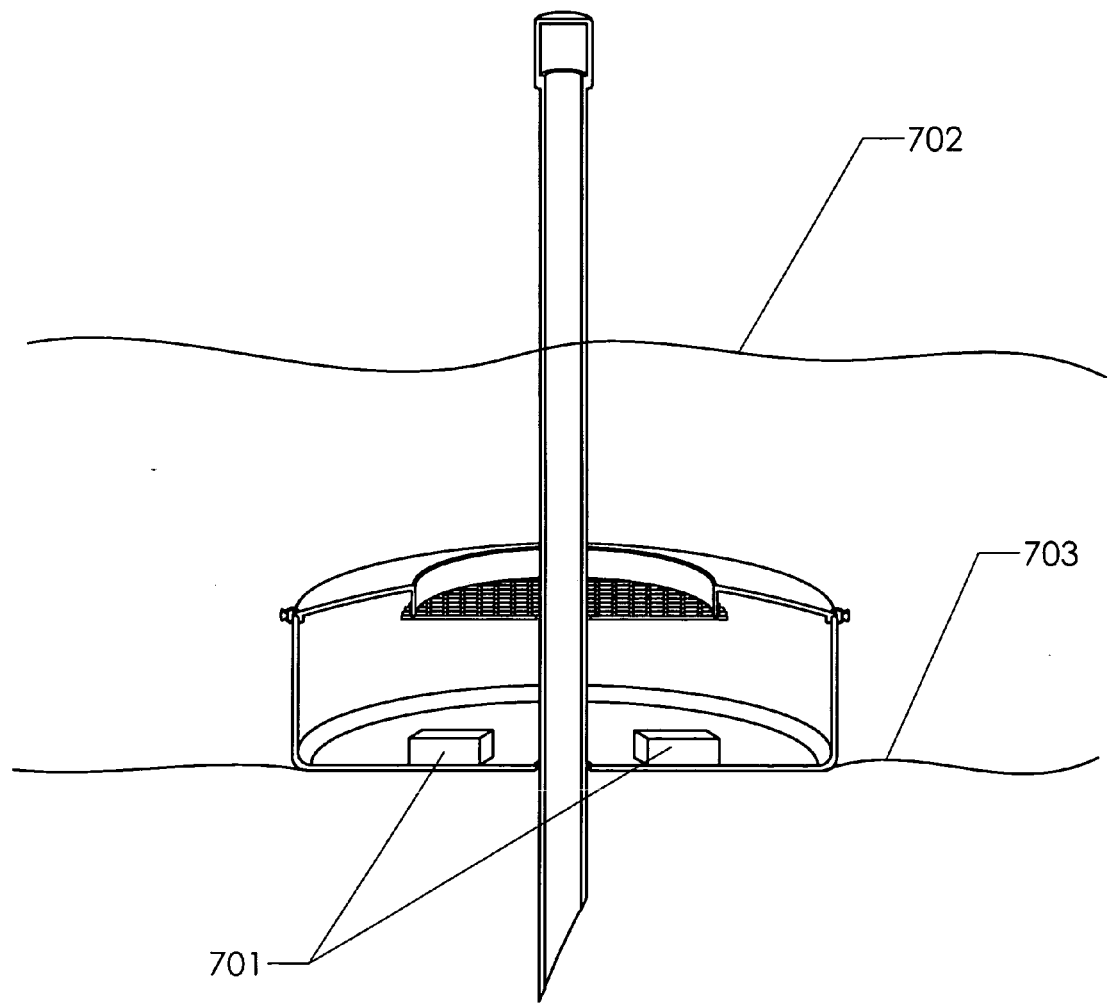
FIG. 7 is a vertical section of the snail trap of the present invention deployed in a water body.

In operation, as shown in FIG. 7, trap 100 is placed in a water body and positioned on the bottom 703 of a water body at a water surface 702 level such that water partially covers standpipe 101. Standpipe 101 extends through base 304 through penetration 305 and is secured into bottom 703 of the water body to hold trap 100 in place. In an alternate embodiment, standpipe 101 does not penetrate through base 304 and trap 100 is weighted to secure it to the bottom of a water body. Bait 701, is positioned within basin 103. Snails are lured to trap 100 by bait 701. Once at trap 100, a snail can climb vertical wall 302, move along shoulder 306, then drop over vertical surface 300 onto screen 105. The weight of the snail causes screen 105 to sink. When the snail moves off of screen 105 to access bait 701, screen 105 then floats back into position at the base of vertical surface 300. As shown in FIG. 6, copper strip 601 is positioned on the back side of vertical surface 300. Because snails will not crawl over a copper surface, even if screen 105 is in close proximity to base 304, snails are retained in trap 100.

Snails prefer to lay their eggs on vertical surfaces above the water line of a water body. In a preferred embodiment, as shown in FIG. 6, standpipe 101 extends above the water line of a water body. When screen 105 is positioned at or near base 304, snails may contact standpipe 101 above screen 105. Snails may then climb standpipe 101 and lay their eggs above the surface of the water body. Because these snail eggs are highly visible, they provide a clear indication that aquatic snails are in a water body. Thus, trap 100 can be used as a sentinel in water bodies where the presence of snails may be suspected.

Bait 701 is preferably a non-toxic, pelletized or block product of the type readily produced by milling companies as animal feed. In a preferred embodiment, bait 701 contains these constituents:

| Ingredient | Percent by Weight |
|---|---|
| Wheat Midds | 31.8 |
| Peanut Hulls | 27.5 |
| Rice Mills | 20 |
| Cottonseed Meal | 12.2 |
| 48% Soybean Meal | 0.5 |
| Alfalfa Meal | 3.9 |
| Calcium | 2.5 |
| SUPER-BIND | 1.0 |
| Salt | 0.65 |

The preceding description contains significant detail regarding the novel aspects of the present invention. It should not be construed, however, as limiting the scope of the invention but rather as providing illustrations of the preferred embodiments of the invention. As an example, trap 100 can alternatively be based on a square, rectangular, or elliptical form factor. Thus, the scope of the invention should be fixed by the following claims, rather than by the examples given.

Having described the invention, we claim:

1. A trap for aquatic snails comprising:
   a. a basin, said basin having a base and one or more substantially vertical side walls extending from said base and creating a receiving volume;
   b. a lid attached to said basin and partially covering said receiving volume to create an opening through said lid into said receiving volume through which said aquatic snails may pass;
   c. a floating screen positioned within said receiving volume, said floating screen disposable between a first position near said lid and a second position near said base; and
   d. a standpipe, said standpipe extending axially through said opening and above said lid, wherein said opening is sized to allow passage of said snails in proximity to said standpipe.

2. The trap of claim 1 wherein said lid further includes a copper strip.

3. The trap of claim 1 wherein said base further includes a penetration through said base.

4. The trap of claim 1 wherein said standpipe extends a sufficient distance above said lid such that said standpipe extends above a surface of a water body in which said trap is placed.

5. The trap of claim 1 wherein said lid is comprised of a first surface extending inward from said vertical side walls, said first surface terminating in a downward, vertical, second surface.

6. The trap of claim 5 wherein said lid further includes a copper strip.

7. The trap of claim 6 wherein said copper strip is attached to said vertical second surface.

8. The trap of claim 1 wherein said basin and said lid are integrally formed.

9. The trap of claim 1 wherein said basin is square.

10. The trap of claim 1 wherein said basin is rectangular.

11. The trap of claim 1 wherein said basin is elliptical.

12. The trap of claim 1 wherein said standpipe provides a guide for said floating screen and extends through said basin base to anchor said trap to a bottom of a water body.

13. The trap of claim 1 further including a bait.

14. The trap of claim 13 wherein said bait is comprised of wheat midds, peanut hulls, rice mills, cottonseed meal, 48% soybean meal, alfalfa meal, calcium, a binding agent, and salt.

15. A trap for aquatic snails comprising:
   a. a basin, said basin having a base and one or more substantially vertical side walls extending from said base and creating a receiving volume suitable for receiving a bait;
   b. a lid attached to said basin and partially covering said receiving volume and creating an opening, said lid comprised of a first surface extending inward from said vertical side walls, said first surface terminating in a downward, vertical, second surface, wherein said second surface defines said opening and said opening is sized to allow the passage of said aquatic snails;
   c. a standpipe extending vertically from said base through said opening and above said lid, wherein said opening is sized to allow passage of said snails in proximity to said standpipe.

16. The trap of claim 15 wherein said lid second surface further includes a copper strip.

* * * * *